A. F. Fletcher,
Pump Lift,
Nº 58,801. Patented Oct. 16 1866.

UNITED STATES PATENT OFFICE.

A. F. FLETCHER, OF ATHOL, MASSACHUSETTS.

IMPROVEMENT IN PUMPS.

Specification forming part of Letters Patent No. 58,801, dated October 16, 1866.

*To all whom it may concern:*

Be it known that I, A. F. FLETCHER, of Athol, in the county of Worcester and State of Massachusetts, have invented new and useful Improvements in Pumps; and I do hereby declare that the following is a full, clear, and exact description thereof, which will enable others skilled in the art to make and use the same, reference being had to the accompanying drawings, forming a part of this specification.

The present invention consists, first, in a novel and peculiar manner of securing the body of the pump to the bottom or pedestal on which it is to be placed; second, in connecting the upper valve-box of the pump with its handle through two rods hung at one end to the handle, and at the other to the valve-box, and on which they are securely fastened and held by means of a staple or other suitable fastening device connecting the two at a point between their two ends, as will be hereinafter explained, whereby the use of many bolts and nuts is dispensed with; and it also consists in many other improvements quite important and essential to the perfect working of the pump, as will be apparent from the following description thereof, reference being had to the accompanying plate of drawings, in which—

Figure 1:
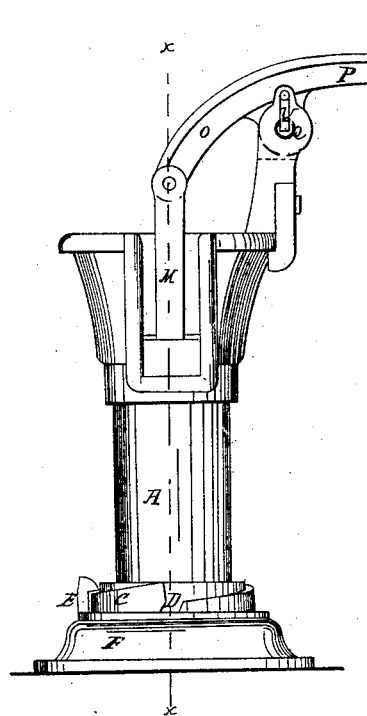
Figure 4:
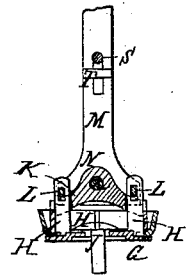
Figure 2:
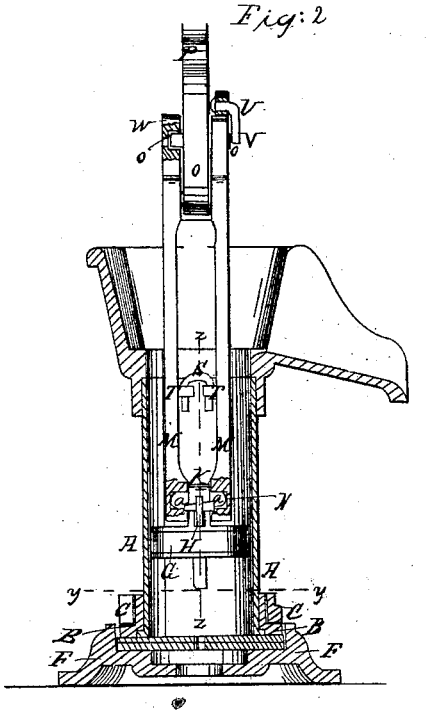
Figure 3:
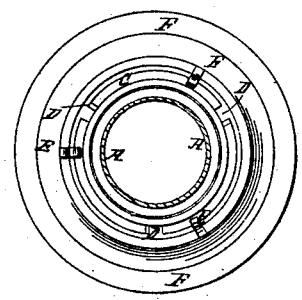
Figure 5:
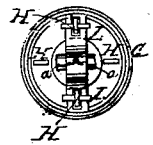

Figure 1 is a side elevation of the pump-barrel; Fig. 2, a central vertical section, taken in the plane of the line $x\,x$, Fig. 1; Fig. 3, a horizontal section, taken in the plane of the line $y\,y$, Fig. 2; Fig. 4, a vertical section, taken in the plane of the line $z\,z$, Fig. 2; Fig. 5, a plan or top view of the upper side of the box.

Similar letters of reference indicate like parts.

A in the drawings is the pump-barrel, on the lower end of which, resting upon a flange, B, is a loose collar, C, having notches D at equal distances apart, the edge of the collar between these notches being beveled or made inclined, as plainly shown in the drawings; E, a series of posts secured to bottom plate, F, of pump, corresponding in position to the notches of the collar of the pump-barrel, and with their upper ends G bent over or made in a hook shape. Between these posts E the lower end of the pump-barrel is placed by bringing the notches of its collar into corresponding position with the same, when, turning the collar round upon the pump-barrel in the proper direction, its inclined ways or edges become wedged under the hook ends of such parts, thereby firmly securing the pump-barrel to its bottom plate, as is obvious.

G is the upper valve-box of the pump, having guides H at suitable points upon the upper side of its lower plate, H, for its valve J, these guides being at equal distances apart and in planes at right angles to each other; K, a bar extending diagonally across and secured to the upper edge of valve-box, through which, at each end, the upper portions of two of the valve-guides extend, each with a key, L, driven through it.

M M are two rods of similar shape and length, and hung by their enlarged or flatted ends N upon a trunnion-pin, $a$, upon opposite sides of the cross-bar K of the valve-box, from which they extend upward parallel with each other through the pump-barrel, and are similarly hung at their upper ends to the short arm O of the lever-handle P, hung and turning upon a fulcrum-pin, Q, of the upright extension-arm R at the upper end of the pump-barrel. These connecting-rods M are secured and held together and upon their bearings, at each end, respectively, of the pump-handle and valve-box, by means of a staple or clasp, S, inserted in and passed through the lugs T of each rod, upon their inner sides, as plainly seen in Fig. 2 of the drawings.

The fulcrum-pin Q, upon which the pump-handle is hung, is held in place by swinging a button, U, properly situated therefor, upon the pump-arm, over one or the projecting end V of the same, the other end of such pin being incased within a bearing, W, of the opposite side of the pump-arm, as plainly shown in Fig. 2.

From the above description of the construction and arrangement of the various parts composing the pump, as well as the manner in which the pump-barrel is secured to its bottom plate, which may be in the form of a pedestal, it is plain to be seen that many bolts and nuts are dispensed with, the pump much simplified, rendered very effective in operation, and in many other respects greatly improved, the double connecting-rods for the valve-box, with the pump-handle, imparting steadiness to the motion of the valve-box, the flattened ends of each of the said rods extending over the upper edge of the valve-box, thus preventing it from rocking or tipping.

Having thus described my invention, I claim as new and desire to secure by Letters Patent—

1. The combination of the loose collar C with the pump-barrel A, and both with the posts E, and all with the bottom plate, F, constructed and operating substantially as described, and for the purposes specified.

2. The combination of the double rod M M, when the parts are connected together by the staple S, with the pump-box G and with the pump-handle P, constructed and operating substantially as described.

3. The guides H, Fig. 4, for the valve, applied to the lower plate of the valve-box, substantially as described.

A. F. FLETCHER.

Witnesses:
CHAS. C. BASSETT,
GILBERT SOUTHARD.